United States Patent
Nakayama et al.

(10) Patent No.: US 9,959,094 B2
(45) Date of Patent: May 1, 2018

(54) ARITHMETIC APPARATUS AND CONTROL METHOD OF THE SAME USING CORDIC ALGORITHM

(71) Applicant: CANON KABUSHIKI KAISHA, Tokyo (JP)

(72) Inventors: Tadayoshi Nakayama, Tokyo (JP); Koki Mitsunami, Toda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 14/729,410

(22) Filed: Jun. 3, 2015

(65) Prior Publication Data

US 2015/0355885 A1 Dec. 10, 2015

(30) Foreign Application Priority Data

Jun. 4, 2014 (JP) ................................ 2014-116196

(51) Int. Cl.
 - *G06F 7/38* (2006.01)
 - *G06F 7/544* (2006.01)
 - *G06F 17/16* (2006.01)

(52) U.S. Cl.
 CPC ............ *G06F 7/5446* (2013.01); *G06F 17/16* (2013.01); *G06F 2207/3884* (2013.01)

(58) Field of Classification Search
 CPC .................................................. G06F 7/5446
 USPC ........................................................ 708/442
 See application file for complete search history.

(56) References Cited

U.S. PATENT DOCUMENTS

2010/0131577 A1* 5/2010 Gangalakurti ........ G06F 7/5446
 708/209
2012/0265796 A1* 10/2012 Vontela ................. G06F 7/5446
 708/440

FOREIGN PATENT DOCUMENTS

| JP | 3283504 B2 | 1/1990 |
| JP | H02-170274 A | 7/1990 |
| WO | 2009/110560 A1 | 9/2009 |

OTHER PUBLICATIONS

Volder, "The CORDIC Trigonometric Computing Technique", IRE Transactions on Electronic Computers, EC-8:330-334, 1959, pp. 226-230.

Gao, et al., "Coarse Angle Rotation Mode CORDIC Based Single Processing Element QR-RLS Processor", 17th European Signal Processing Conference (EUSIPCO 2009), Aug. 2009, pp. 1279-1283.

Takagi, et al., "Redundant CORDIC methods with a Constant Scale Factor for Sine and Cosine Computation", IEEE Trans. on Computers, vol. 40, No. 9, Sep. 1991, pp. 989-995.

(Continued)

*Primary Examiner* — Tan V. Mai
(74) *Attorney, Agent, or Firm* — Carter, DeLuca, Farrell & Schmidt, LLP

(57) ABSTRACT

An arithmetic apparatus comprises a plurality of cascade-connected arithmetic units. Each of the plurality of arithmetic units comprises: a calculator configured to operate in one of a rotation mode of performing a rotation calculation, and a vectoring mode of calculating a rotation angle; and a holding unit configured to hold rotational direction information output from the calculator in the vectoring mode. In addition, when operating in the rotation mode, the calculator performs the rotation calculation on data input from an arithmetic unit in a preceding stage, based on the rotational direction information held in the holding unit.

11 Claims, 14 Drawing Sheets

(56) References Cited

OTHER PUBLICATIONS

Naofumi Takagi, "Algorithms for Elementary Function Generators <Algorithms for Arithmetic Circuits 4>," Journal of Information Processing Society of Japan, Apr. 15, 1996, vol. 37, No. 4, pp. 362-368 with English translation of pp. 364, lines 28-43.
Japanese Office Action dated Jan. 26, 2018 in corresponding Japanese Patent Application No. 2014-116196, together with English translation.

* cited by examiner

PRIOR ART

FIG. 5A

| VECTORING MODE | ROTATION MODE | COORDINATE ROTATION MAGNIFICATION TO ARGUMENT |
|---|---|---|
| SINGLE TYPE | SINGLE TYPE | EQUAL |
| SINGLE TYPE | DOUBLE TYPE | 2 TIMES |
| DOUBLE TYPE | SINGLE TYPE | 1/2 TIMES |
| DOUBLE TYPE | DOUBLE TYPE | EQUAL |

FIG. 5B

| VECTORING MODE | ROTATION MODE | COORDINATE ROTATION MAGNIFICATION TO ARGUMENT |
|---|---|---|
| SINGLE TYPE | SINGLE TYPE | EQUAL |
| SINGLE TYPE | DOUBLE TYPE | 2 TIMES |
| SINGLE TYPE | TRIPLE TYPE | 3 TIMES |
| DOUBLE TYPE | SINGLE TYPE | 1/2 TIMES |
| DOUBLE TYPE | DOUBLE TYPE | EQUAL |
| DOUBLE TYPE | TRIPLE TYPE | 3/2 TIMES |
| TRIPLE TYPE | SINGLE TYPE | 1/3 TIMES |
| TRIPLE TYPE | DOUBLE TYPE | 2/3 TIMES |
| TRIPLE TYPE | TRIPLE TYPE | EQUAL |

FIG. 7A

| ROTATIONAL DIRECTION INFORMATION (WEIGHTED) | | | NON-ROTATION |
|---|---|---|---|
| INPUT1 | INPUT2 | OUTPUT | OUTPUT NON |
| -1 | -1 | -2 | 0 |
| -1 | +1 | ±0 | 1 |
| +1 | -1 | ±0 | 1 |
| +1 | +1 | +2 | 0 |

FIG. 7B

| ROTATIONAL DIRECTION INFORMATION (WEIGHTED) | | | NON-ROTATION |
|---|---|---|---|
| INPUT1 | INPUT2 | OUTPUT | OUTPUT NON |
| -1 | -1 | ±0 | 1 |
| -1 | +1 | -2 | 0 |
| +1 | -1 | +2 | 0 |
| +1 | +1 | ±0 | 1 |

FIG. 7C

| ROTATIONAL DIRECTION INFORMATION (WEIGHTED) | | | NON-ROTATION |
|---|---|---|---|
| INPUT1 | INPUT2 | OUTPUT | OUTPUT NON |
| -2 | -2 | -2 | 0 |
| -2 | +2 | ±0 | 1 |
| +2 | -2 | ±0 | 1 |
| +2 | +2 | +2 | 0 |

FIG. 7D

| ROTATIONAL DIRECTION INFORMATION (WEIGHTED) | | | NON-ROTATION |
|---|---|---|---|
| INPUT1 | INPUT2 | OUTPUT | OUTPUT NON |
| -1 | -2 | -2 | 0 |
| -1 | +2 | ±0 | 1 |
| +1 | -2 | ±0 | 1 |
| +1 | +2 | +2 | 0 |

FIG. 7E

| ROTATIONAL DIRECTION INFORMATION (WEIGHTED) | | | NON-ROTATION |
|---|---|---|---|
| INPUT1 | INPUT2 | OUTPUT | OUTPUT NON |
| -2 | -1 | -2 | 0 |
| -2 | +1 | ±0 | 1 |
| +2 | -1 | ±0 | 1 |
| +2 | +1 | +2 | 0 |

FIG. 12A

| NUMBER i OF PIPELINE STAGES | 1 | 2 | 3 | 4 | 5 | 6 | 7 | 8 | 9 | 10 |
|---|---|---|---|---|---|---|---|---|---|---|
| MODE SIGNAL | 1 (NORMALIZATION) | 1 | 1 | 1 | 1 | 1 | 1 | 1 | 1 | 1 |
| FIRST DATA $x_i$ | 1.732 | 1.732 | 1.732 | 1.732 | 1.732 | 1.732 | 1.732 | 1.732 | 1.732 | 1.732 |
| SECOND DATA $y_i$ | 0.866 | 1.299 | 1.083 | 0.974 | 1.028 | 1.001 | 0.988 | 0.995 | 0.998 | 1.000 |
| ADDITION/SUBTRACTION DETERMINATION INFORMATION | + | + | − | − | + | − | − | + | + | + |

FIG. 12B

| NUMBER i OF PIPELINE STAGES | 1 | 2 | 3 | 4 | 5 | 6 | 7 | 8 | 9 | 10 |
|---|---|---|---|---|---|---|---|---|---|---|
| MODE SIGNAL | 0 (DIVISION) | 0 | 0 | 0 | 0 | 0 | 0 | 0 | 0 | 0 |
| FIRST DATA $x_i$ | 1.414 | 1.414 | 1.414 | 1.414 | 1.414 | 1.414 | 1.414 | 1.414 | 1.414 | 1.414 |
| SECOND DATA $y_i$ | 0.707 | 1.061 | 1.884 | 0.795 | 0.840 | 0.818 | 0.807 | 0.812 | 0.815 | 0.816 |
| ADDITION/SUBTRACTION DETERMINATION INFORMATION | + | + | − | − | + | − | − | + | + | + |

ARITHMETIC APPARATUS AND CONTROL METHOD OF THE SAME USING CORDIC ALGORITHM

BACKGROUND OF THE INVENTION

Field of the Invention

The present invention relates to an arithmetic apparatus based on digital signal processing.

Description of the Related Art

An arithmetic algorithm called "CORDIC (COordinate Rotation DIgital Computer)" which implements coordinate rotation of complex number data on a complex plane and coordinate rotation of two-dimensional coordinate data on a two-dimensional plane by only bit shift and addition and/or subtraction is disclosed in "J. E. Volder, "The CORDIC trigonometric computing technique", IRE Transactions on Electronic Computers, EC-8:330-334, 1959". Also, multidimensional signals are recently advancing as signal processing advances, and it has become necessary to perform a process of obtaining, for example, an optimal solution by solving multidimensional simultaneous equations in real time. Therefore, demands have arisen for an arithmetic apparatus having a high operation accuracy and high processing performance.

For example, when using the above-described CORDIC, several tens of pipelined CORDICs having 20 or more stages are sometimes necessary for an arithmetic operation of 20 or more bits. Since, however, it is necessary to stably operate the system at a high frequency, demands have arisen for a compact CORDIC having a smaller circuit configuration.

Accordingly, techniques capable of efficiently performing a coordinate rotation calculation with a small delay in the CORDIC are disclosed in "Qiang Gao, Louise Crockett and Robert Stewart, "COARSE ANGLE ROTATION MODE CORDIC BASED SINGLE PROCESSING ELEMENT QR-RLS PROCESSOR", 17th European Signal Processing Conference (EUSIPCO 2009) Glasgow, Scotland, Aug. 4-28, 2009" and Japanese Patent No. 3283504 (patent literature 1). In addition, an improved technique called a double-rotation CORDIC is disclosed in "N. Takagi, T. Asada, and S. Yajima, "Redundant CORDIC methods with a constant scale factor for sine and cosine computation", IEEE Trans. Computers, vol. 40, no. 9, pp. 989-995, September 1991".

When the contents of actual arithmetic operations are taken into consideration, however, the vectoring-mode arithmetic performance of the above-described conventional CORDIC arithmetic apparatus is presumably redundant.

That is, in linear algebraic processing of a matrix, the number of vectoring-mode operations of detecting the argument of two-dimensional coordinate data is much smaller than that of rotation-mode operations of rotating the coordinate data based on the detected argument. On the other hand, in the CORDIC of the arithmetic apparatus disclosed in the above-described related art, the vectoring-mode arithmetic performance of detecting the argument and the rotation-mode arithmetic performance of rotating the coordinate data based on the detected argument are equal. That is, the vectoring-mode arithmetic performance of detecting the argument is redundant, so the arithmetic resources are perhaps not effectively used.

SUMMARY OF THE INVENTION

According to one aspect of the present invention, an arithmetic apparatus comprising a plurality of cascade-connected arithmetic units, each of the plurality of arithmetic units comprises: a calculator configured to operate in one of a rotation mode of performing a rotation calculation, and a vectoring mode of calculating a rotation angle; and a holding unit configured to hold rotational direction information output from the calculator in the vectoring mode, wherein when operating in the rotation mode, the calculator performs the rotation calculation on data input from an arithmetic unit in a preceding stage, based on the rotational direction information held in the holding unit.

According to another aspect of the present invention, an arithmetic apparatus comprising a plurality of cascade-connected arithmetic units, wherein each of the plurality of arithmetic units comprises: a calculator configured to operate in one of a normalization mode and a division mode; and a holding unit configured to hold addition/subtraction determination information to be output from the calculator in the normalization mode, and when operating in the division mode, the calculator performs division on data input from an arithmetic unit in a preceding stage, based on the addition/subtraction determination information held in the holding unit.

The present invention can implement an arithmetic apparatus capable of efficiently using an arithmetic circuit and having a small circuit scale.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are views showing examples of the setting of the rotation magnification;

FIGS. 12A and 12B are views showing examples of calculations in a normalization mode and division mode.

DESCRIPTION OF THE EMBODIMENTS

Preferred embodiments of the present invention will be explained in detail below with reference to the accompanying drawings. Note that the following embodiments are merely examples, and are not intended to limit the scope of the present invention.

First Embodiment

The first embodiment of an arithmetic apparatus according to the present invention will be explained below by taking an arithmetic apparatus using a CORDIC algorithm as an example. In particular, a pipelined arithmetic apparatus in which n (n is an integer of 2 or more) identical arithmetic units are cascade-connected will be explained.

<CORDIC Algorithm>

First, the CORDIC algorithm will briefly be explained. The CORDIC repetitively rotates an angle series arctan($2^{-n}$) (n=0, 1, 2, 3, . . . ) by only bit shift and addition and/or subtraction, thereby rotating two-dimensional coordinates (a two-dimensional vector) and converging the coordinates to a desired angle. Note that the CORDIC has two operation modes, that is, a vectoring mode and rotation mode, and time-divisionally operates. In the vectoring mode, the CORDIC converts two-dimensional coordinates into polar coordinates, and outputs the distance (absolute value) and argument of the two-dimensional coordinates from the origin. On the other hand, in the rotation mode, the CORDIC inputs the argument obtained in the vectoring mode or an angle calculated by using the argument as a rotation angle, and outputs coordinate data obtained by rotating another input coordinate data by the rotation angle. In either mode, the CORDIC repetitively rotates the angle series.

Information supplied from the vectoring mode to the rotation mode is generally an argument represented by degree or radian. When outputting the argument in the vectoring mode, the argument is converted into an angle corresponding to each coordinate rotation calculation, and an accumulation result obtained by adding and/or subtracting the angles in accordance with the rotational direction is output. Note that "argument" is a readily understandable expression for a human, but cannot directly be used in the coordinate rotation calculation. In the rotation mode, therefore, the argument is returned to information representing the rotational direction in the vectoring mode, and used to control the coordinate rotation calculation.

Figure 1A:
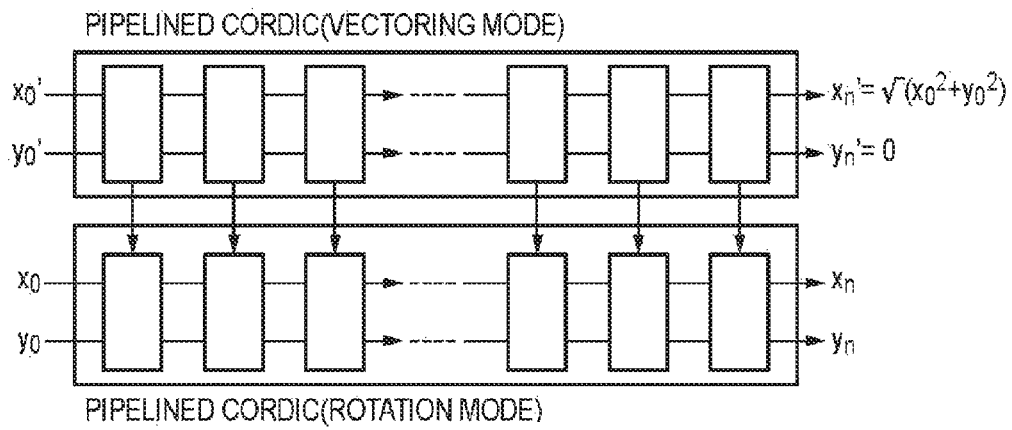
FIGS. 1A and 1B are views for explaining a pipelined CORDIC.
Figure 1B:
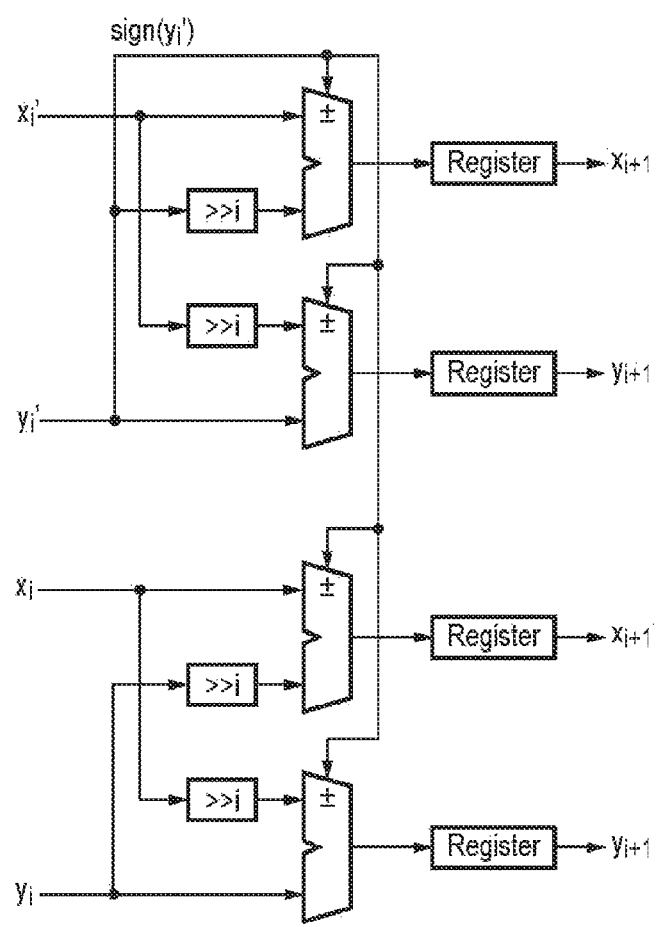

FIGS. 1A and 1B are views for explaining a conventional pipelined CORDIC calculator used in non-patent literature 2. As shown in FIG. 1A, two pipelines, that is, a vectoring-mode pipeline and rotation-mode pipeline are arranged in the conventional pipelined CORDIC calculator. Between these two pipelines, binary information representing the rotational direction is supplied from a vectoring-mode arithmetic unit to a corresponding rotation-mode arithmetic unit.

FIG. 1B shows the circuit configuration of the ith arithmetic unit of the pipeline. i is generally a natural number of n or less, and i=0, 1, 2, 3, . . . , n−1 in this embodiment. Referring to FIG. 1B, input data $x_i'$ and $y_i'$ are coordinate data to be input to an arithmetic unit which operates in the vectoring mode. This arithmetic unit which operates in the vectoring mode receives the data, and performs a vectoring-mode arithmetic operation by using two shift circuits and two adders/subtracters. Also, input data $x_i$ and $y_i$ are data to be input to an arithmetic unit which operates in the rotation mode. This arithmetic unit which operates in the rotation mode receives the data, and performs a rotation-mode arithmetic operation by using two shift circuits and two adders/subtracters.

In this case, the direction of coordinate rotation is determined by the sign($y_i'$) of the data $y_i'$. That is, assuming that the coordinate data ($x_i'$, $y_i'$) exists in the first or fourth quadrant, a clockwise rotation calculation is performed when sign($y_i'$)=0, and a counterclockwise rotation calculation is performed when sign($y_i'$)=1. The rotation calculations of the same directions are applied to the rotation target data $x_i$ and $y_i$.

For example, arithmetic operations of obtaining $x_{i+1}$ and $y_{i+1}$ by rotating the rotation target data $x_i$ and $y_i$ clockwise are as follows:

$$x_{i+1} = x_i + (2^{-i}) \cdot y_i$$

$$y_{i+1} = y_i - (2^{-i}) \cdot x_i \quad (1)$$

Data on the left-hand side is input data to an arithmetic unit in the next state (that is, the (i+1)th stage). Data obtained by multiplication of ($2^{-i}$) on the right-hand side is obtained via a circuit which shifts $x_i$ and $y_i$ as multiplication target data rightward by i bits. On the other hand, in counterclockwise rotation, the arithmetic operation is performed by switching addition to subtraction and vice versa on the right-hand side.

Note that in the above-described rotation calculation, normalization is not performed on the calculation result because a simple calculation is the feature, so data expands by $\sqrt{(1+2^{-2i})}$ whenever the calculation is performed. Since the total expansion magnification is determined in accordance with the number of stages of the arithmetic operation, correction is performed by, for example, multiplication of a predetermined coefficient when all the rotation calculations are completed. This correction is generally called scaling correction.

<Apparatus Arrangement>

When processing is completed with the vectoring mode and rotation mode (that is, when no argument is necessary outside), the process of converting the rotational direction information into the argument in the vectoring mode and returning the argument to the original rotational direction information is redundant processing. Therefore, the coordinate rotation calculation can efficiently be performed by directly supplying the rotational direction information. In addition, low-delay processing is probably possible because conversion to the argument and inverse conversion from it are unnecessary.

Figure 2:
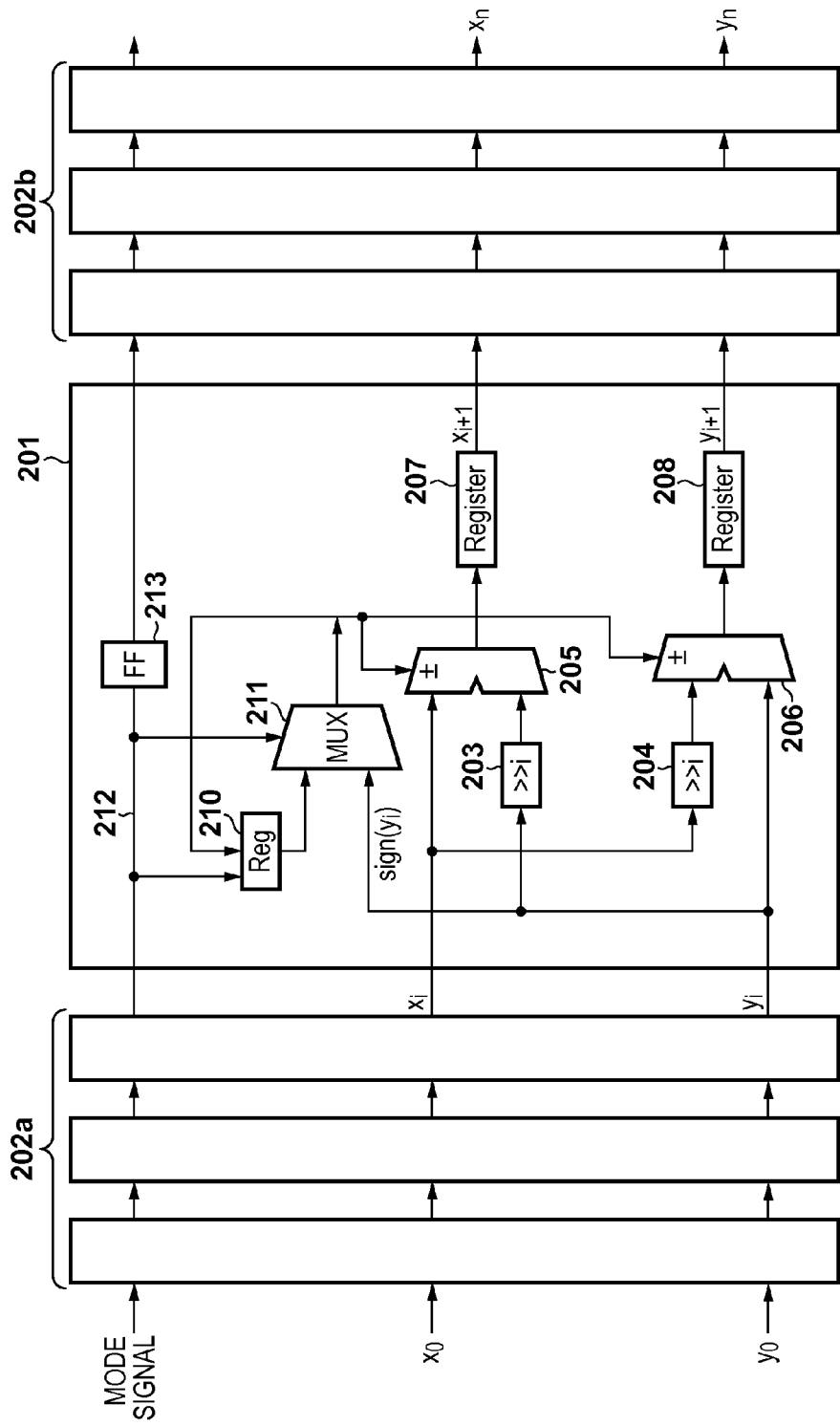
FIG. 2 is a view showing the arrangement of an arithmetic apparatus according to the first embodiment.

FIG. 2 is a view showing the arrangement of the arithmetic apparatus according to the first embodiment. An arithmetic unit 201 represents the arrangement of the ith-stage (i=0, 1, 2, 3, . . . ) arithmetic unit forming the pipeline. Front-stage arithmetic units 202a are arranged before the arithmetic unit 201, and rear-stage arithmetic units 202b are arranged after the arithmetic unit 201. The arrangement of each arithmetic unit is the same as that of the arithmetic unit 201. FIG. 2 exemplarily shows seven stages of arithmetic units, but the number of stages can be any arbitrary number of two or more.

The arrangement of the arithmetic unit 201 will be explained. In this arithmetic unit, a bit shifter 203 shifts input y-coordinate data rightward by i bits. Also, a bit shifter 204 shifts input x-coordinate data rightward by i bits. Furthermore, an adder/subtracter 205 adds or subtracts the output of the bit shifter 203 to or from the input x-coordinate data. An adder/subtracter 206 adds or subtracts the output of the bit shifter 204 to or from the input y-coordinate data.

A register 207 holds the rotated x-coordinate value as the output from the adder/subtracter 205 for one cycle. A register 208 holds the rotated y-coordinate value as the output from the adder/subtracter 206 for one cycle.

The six elements described above are constituent elements essential in an ordinary CORDIC as well. The coordinate rotation calculation of equation (1) described above is performed by using these elements, and the results are held in the registers 207 and 208.

Next, constituent elements additionally necessary in the apparatus according to the first embodiment will be explained. A register 210 is a 1-bit register for holding the rotational direction information. A selector 211 selects one of the sign (sign(y)) of the input y-coordinate value and the rotational direction information held in the register 210.

A signal line 212 distributes 1-bit mode information representing whether the processing mode of coordinate data currently being rotated by the arithmetic unit is the vectoring mode or rotation mode. A delay device 213 delays this mode information by one cycle.

<Operation of Apparatus>

The operation of the arithmetic unit 201 in the vectoring mode and rotation mode will be explained below. As a practical operation, an example in which processing is performed one cycle in the vectoring mode and then six cycles in the rotation mode will be explained.

As described above, the mode information is used as a control signal for changing the operation mode. For example, one cycle of mode information "1" as the vectoring mode and six cycles of mode information "0" as the rotation mode are input to the first-stage arithmetic unit. That is, one coordinate data for a vectoring operation is input in synchronism with mode information "1", and subsequently six coordinate data for a rotation calculation are input in synchronism with mode information "0".

Each arithmetic unit operates in the vectoring mode when mode information "1" is input. In the vectoring mode, the selector 211 selects sign(y) so as to control the arithmetic operations of the adders/subtracters 205 and 206 based on sign(y), as in the conventional apparatus. In this processing, the output from the selector 211 is supplied to the register 210 for holding the rotation direction information. The rotation calculation integrating the rotational direction information held in the whole pipeline corresponds to the argument of the coordinate data for the vectoring operation.

Each arithmetic unit operates in the rotation mode when mode information "0" is input. In the rotation mode, the selector 211 selects the rotational direction information held in the register 210, and rotates the coordinate data based on the rotational direction information. Since the rotational direction information is kept held while the mode information is "0", the same rotation calculation is performed on the six continuously input coordinate data.

When (1,0) is input as coordinate data in the rotation mode, this coordinate data is rotated by a detection argument θ in the vectoring mode in the whole pipeline, and (sin(θ), cos(θ)) is output as the rotation result. In this processing, it is also possible to input a value obtained by multiplying (1, 0) by a scaling correction coefficient unique to the CORDIC. The value of the output rotation result represents a unit-direction vector of the coordinate data processed in the vectoring mode, and can be used in, for example, a two-dimensional rotating process using a multiplier. However, it is meaningless to calculate the values of sine and cosine many times by using the same rotational direction information, and the calculation need only be performed once. Accordingly, coordinate data (1, 0) need only be input in one cycle.

<Addition of Pipeline for Calculating Rotation Angle θ>

Various kinds of processing can be performed by the vectoring mode, rotation mode, and sine/cosine calculating function. However, the value of the argument of coordinate data cannot be known. Therefore, a pipeline for calculating the rotation angle θ can be added in order to know the argument.

Figure 3:
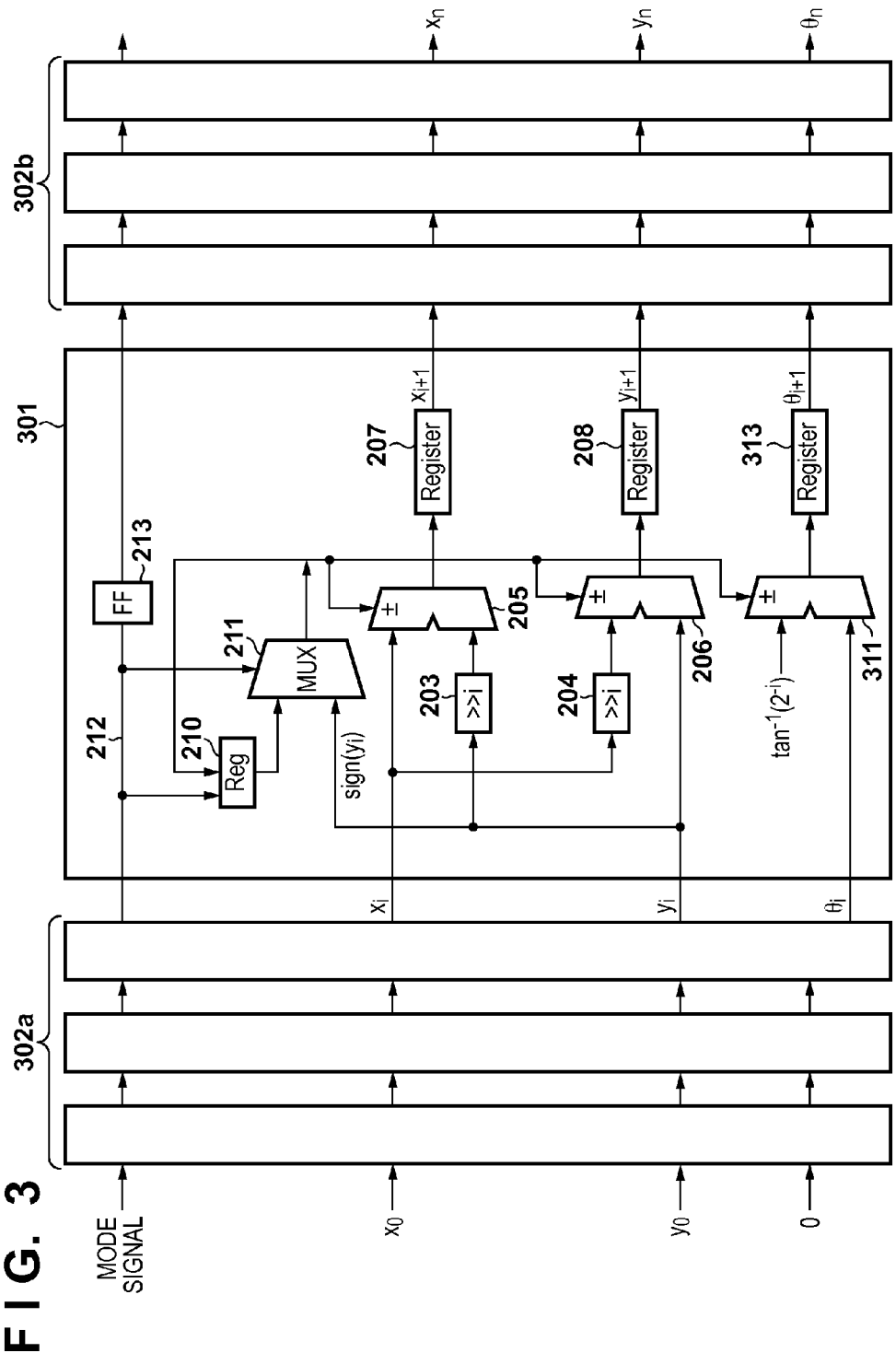
FIG. 3 is a view showing another arrangement of the arithmetic apparatus according to the first embodiment.

FIG. 3 is a view showing another arrangement of the arithmetic apparatus according to the first embodiment. This arrangement is obtained by adding a pipeline for calculating the rotation angle θ to the arrangement shown in FIG. 2. Each arithmetic unit has the same arrangement as that of 301. An adder/subtracter 311 added to the arithmetic unit 301 performs addition or subtraction on the angle series in accordance with the rotational direction, and a register 313 holds the angle for one cycle, and outputs the angle to the arithmetic unit in the next stage.

When rotating the input coordinate data based on the input rotation angle θ, the arithmetic unit generates rotational direction information from the rotation angle as needed, like the operation of the conventional CORDIC. Then, the addition or subtraction of the arithmetic unit is controlled based on the generated rotational direction information.

More specifically, the pipeline added in FIG. 3 is almost the same as the conventional angle calculating path. To generate rotational direction information from the input rotation angle as needed, therefore, the selector 211 need only select the sign of data of the added calculating path, that is, sign($\theta_i$).

When selected sign ($\theta_i$) is held in the register 210, sign($\theta_i$) can be used in the rotation calculation of the input coordinate data. More specifically, an interconnection to the register 210 need only be added as in the case of sign($y_i$), so the arrangement is not shown. While the rotation angle of the rotation calculation remains the same, the information held in the register 210 can be used. Accordingly, input of the rotation angle to the pipeline can be stopped while the rotation angle of the rotation calculation remains the same.

Finally, processing when the upper pipelined CORDIC of the two pipelined CORDICs shown in FIG. 1A is replaced with the pipelined CORDIC shown in FIG. 2 will be explained. The pipelined CORDIC shown in FIG. 2 does not clearly show the rotational direction information to be output to the lower pipeline shown in FIG. 1A, but the above-mentioned explanation indicates that the output from the selector 211 need only be output to the lower stage. In this example, a case in which nine coordinate data are rotated based on one argument will be explained.

In the first cycle, vector calculation is performed in the upper stage, and a rotation calculation is performed in the lower stage. In the second to fifth cycles, the mode and the like are so set as to perform a rotation calculation in both the upper and lower stages. That is, data input to the pipelined CORDIC is performed in a five-cycle period. As a result, in a five-cycle period after a cycle equivalent to the number of pipeline stages, coordinate data obtained by rotating the input coordinate data is output from the pipeline.

In the first embodiment as has been explained above, the rotational direction information generated in the vectoring mode is held in the register in each arithmetic unit forming the pipelined CORDIC. Then, a rotation calculation of coordinate data in the rotation mode is performed based on the held rotational direction information.

In this arrangement, one pipelined CORDIC can process both the vectoring mode and rotation mode. Therefore, the process of rotating a plurality of coordinate data by the argument detected in the vectoring mode can efficiently be performed by the low-cost circuit. More specifically, processing performance almost equal to that of the conventional apparatus can be implemented by a half circuit scale.

(Modification 1)

As modification 1, an arrangement based on the double-rotation CORDIC disclosed in non-patent literature 3 will be explained.

<Double-Rotation CORDIC>

The double-rotation CORDIC is an arrangement which implements θ rotation by performing θ/2 rotation twice. In this case, non-rotation can be implemented under certain conditions. Therefore, the rotation of each stage can be selected from three rotation angles (+θ, 0, −θ), and this contributes to improving the arithmetic accuracy. There is another advantage that the coefficient for use in scaling correction becomes simpler than the conventional coefficient.

For example, an arithmetic operation of obtaining $x_{i+1}$ and $y_{i+1}$ by rotating rotation target data $x_i$ and $y_i$ clockwise is as follows:

$$x_{i+1}=(1-2^{-2i}) \cdot x_i + (2^{-(i-1)}) \cdot y_i$$

$$y_{i+1}=(1-2^{-2i}) \cdot y_i - (2^{-(i-1)}) \cdot x_i \qquad (2)$$

Data on the left-hand side is input data to the arithmetic unit in the next stage. Also, data obtained by multiplication of $(2^{-i})$ on the right-hand side is obtained via a circuit which shifts $x_i$ and $y_i$ as multiplication target data rightward by i bits. On the other hand, when performing counterclockwise rotation, an arithmetic operation is performed by switching addition to subtraction and vice versa on the right-hand side.

The data expansion magnification in the above-described arithmetic operation is $(1+2^{-2i})$, and this expansion can be implemented by only bit shift and addition. When performing non-rotation, therefore, the following scaling calculation is performed instead of above-described equations (2):

$$x_{i+1}=(1+2^{-2i}) \cdot x_i$$

$$y_{i+1}=(1+2^{-2i}) \cdot y_i \qquad (3)$$

When performing this scaling calculation, scaling correction to be performed last can be uniform regardless of whether the arithmetic operation in each stage is rotation or non-rotation.

The angle series of the double-rotation CORDIC except for non-rotation is $2 \cdot \arctan(2^{-i})$ (i=0, 1, 2, 3, . . . ), that is, twice that of the CORDIC explained with reference to FIGS. 1A and 1B.

<Apparatus Arrangement>

Figure 4:
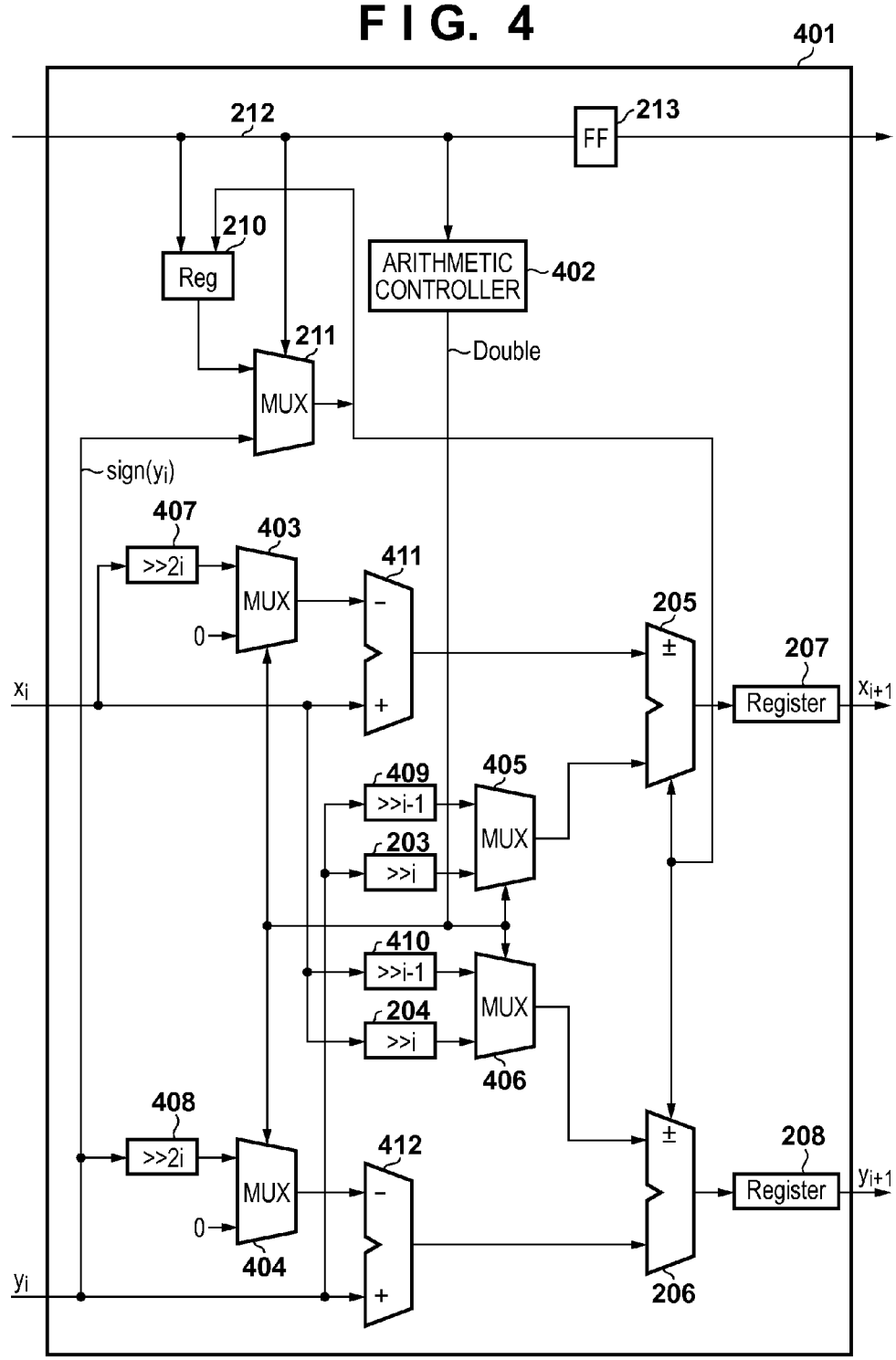
FIG. 4 is a view showing the arrangement of an arithmetic unit according to modification 1.

FIG. 4 is a view showing the arrangement of the arithmetic unit in modification 1. An arithmetic unit 401 shown in FIG. 4 is equivalent to replacement of the arrangement of the arithmetic unit 201 shown in FIG. 2. All arithmetic units forming the pipelined CORDIC have the same arrangement as that of the arithmetic unit 401.

The arithmetic unit 401 has a feature that it includes a register 210 for holding rotational direction information, and has another feature that it can execute two kinds of rotation calculations different in angle series, and switches the two calculations by the vectoring mode and rotation mode.

Of the two rotation calculations, one rotation calculation is based on the general CORDIC arithmetic operation indicated by equations (1), and the other rotation calculation is based on the double-rotation CORDIC arithmetic operation indicated by equations (2). That is, of the two rotation calculations, the angle series of one rotation calculation is $\arctan(2^{-i})$, that of the other rotation calculation is $2 \cdot \arctan(2^{-i})$, and the latter is exactly twice the former. This relationship can implement rotating processes which are 1/2 times and two times the argument of the vector input coordinates. The arithmetic operation of equations (1) will be called "the single type calculation" and the arithmetic operation of equations (2) will be called "the double type calculation" hereinafter.

More specifically, constituent elements added in FIG. 4 are constituent elements added to the arithmetic unit 201 shown in FIG. 2 for performing the single type calculation, so as to be able to execute the double type calculation. These constituent elements will briefly be explained.

An arithmetic controller 402 generates a control signal Double for switching the single type calculation and double type calculation. Selectors 403 to 406 each select one of two inputs based on the control signal Double.

Bit shifters 407 to 410 generate terms necessary for the arithmetic operation of equations (2). Subtracters 411 and 412 subtract input values.

When performing the single type calculation, the arithmetic controller 402 outputs control signal Double=0, and the four selectors 403 to 406 as the connection destinations of the control signal select the lower input signals in FIG. 4. That is, the selectors 403 and 404 select "0" and supply "0" to the subtracters 411 and 412, and the subtracters 411 and 412 directly output $x_i$ and $y_i$ as other inputs. On the other hand, the selectors 405 and 406 select the outputs from the i-bit shifters 203 and 204, and supply the outputs to the adders/subtracters 205 and 206. Accordingly, the arithmetic unit 401 performs the same arithmetic operation as that of the arithmetic unit 201 shown in FIG. 2, that is, performs the single type calculation.

When performing the double type calculation, the arithmetic controller 402 outputs control signal Double=1, and the four selectors 403 to 406 as the connection destinations of the control signal select the upper input signals in FIG. 4. That is, the selectors 403 and 404 select the outputs from the 2i-bit shifters, and the selectors 405 and 406 select the outputs from the (i−1)-bit shifters. As a result, the subtracter 205 outputs $(1-2^{-2i}) \cdot x_i$, and the subtracter 206 outputs $(1-2^{-2i}) \cdot y_i$. Then, the outputs from the (i−1)-bit shifters are added to or subtracted from the subtraction results based on sign($y_i$). This addition/subtraction calculation is the same as the arithmetic operation of equations (2).

Thus, the single type calculation and double type calculation can be switched by the control signal Double output from the arithmetic controller 402. Also, the ratio of the two rotation angles with respect to the same i is exactly 1:2 (an integral ratio), and this ratio is directly the ratio of the rotation angles of the two kinds of rotation calculations in each arithmetic unit.

Even when the two kinds of rotation calculations can be executed, if the vectoring mode and rotation mode operate by the same rotation calculation, the function is the same as that of a general CORDIC. That is, coordinate data is rotated by the argument of another coordinate data detected in the vectoring mode.

<Operation of Apparatus>

The characteristic functions implemented by the above-described arrangement are the rotating processes which are 1/2 times and two times the argument of the vector input coordinates. To implement these functions, it is necessary to switch the two kinds of rotation calculations between the vectoring mode and rotation mode. More specifically, when the single type calculation is performed in the vectoring mode, the double type calculation is performed in the rotation mode; when the double type calculation is performed in the vectoring mode, the single type calculation is performed in the rotation mode. Consequently, the former can implement a rotation which is two times the argument, and the latter can implement a rotation which is 1/2 times the argument.

As described above, the rotation angle ratio is twice in each arithmetic unit. Therefore, the binary rotational direction information held when performing the single type calculation is regarded as {−1, +1}, the binary rotational direction information held when performing the double type calculation can be regarded as exactly {−2, +2}. In this case, the magnitude difference is the weight corresponding to the rotation angle.

Accordingly, using the rotational direction information held by the single type calculation in the double type calculation is equivalent to doubling the weight of the held rotational direction information. The opposite case is equivalent to halving the weight of the rotational direction information. This is the reason why the rotation which is two times or 1/2 times the argument of the vector input coordinates can be implemented. Note that when the vectoring mode and rotation mode operate by the same rotation calculation, the weight of the rotational direction information is held, so the rotation is equal to the argument.

FIGS. 5A and 5B are views showing the coordinate rotation magnifications with respect to combinations of calculation types in the vectoring mode and rotation mode. FIG. 5A shows an example when using the above-described single type and double type calculations as the calculation types.

In the above explanation, the rotation angle ratio of the two kinds of rotation calculations in each arithmetic unit is two, so implementable rotating functions are two times and 1/2 times the argument of the vector input coordinates. Similarly, when an arithmetic function having a rotation angle ratio which is three times that of the single type calculation is used and switched as a third rotation calculation, this function is 3/2 times the double type calculation. Accordingly, the number of rotating processes implementable by switching the three kinds of calculations largely increases, and it is also possible to perform rotations which are three times, 3/2 times, 2/3 times, and 1/3 times the argument of the vector input coordinates.

FIG. 5B shows an example when a triple type calculation is further used as a calculation type. "The triple type operation" is an arithmetic operation for which the angle series of the rotation angle is three times that of the single type calculation. Note that it is also possible to additionally use "a quadruple type calculation" and "a quintuple type calculation" in the same manner as above.

(Modification 2)

As modification 2, an arrangement capable of implementing a more complicated rotating function will be explained. More specifically, one arithmetic unit can hold a plurality of pieces of rotational direction information, inter-bit operations are performed between the plurality of pieces of rotational direction information, and each arithmetic unit controls the rotational direction based on the inter-bit operation results.

That is, in modification 1, rotational direction information is generated from one vector coordinate data and held, and rotation target coordinate data input after that is rotated based on the held rotational direction information. In modification 2, however, a plurality of pieces of rotational direction information are generated from a plurality of vector coordinate data.

In particular, modification 2 uses a non-rotation calculation as a feature of the double-rotation CORDIC in the rotation mode. This is so because when two pieces of rotational direction information have opposite directions and an inter-bit operation which additionally synthesizes the information is performed, the rotations cancel each other and yield an operation result meaning non-rotation in some cases.

<Apparatus Arrangement>

Figure 6:
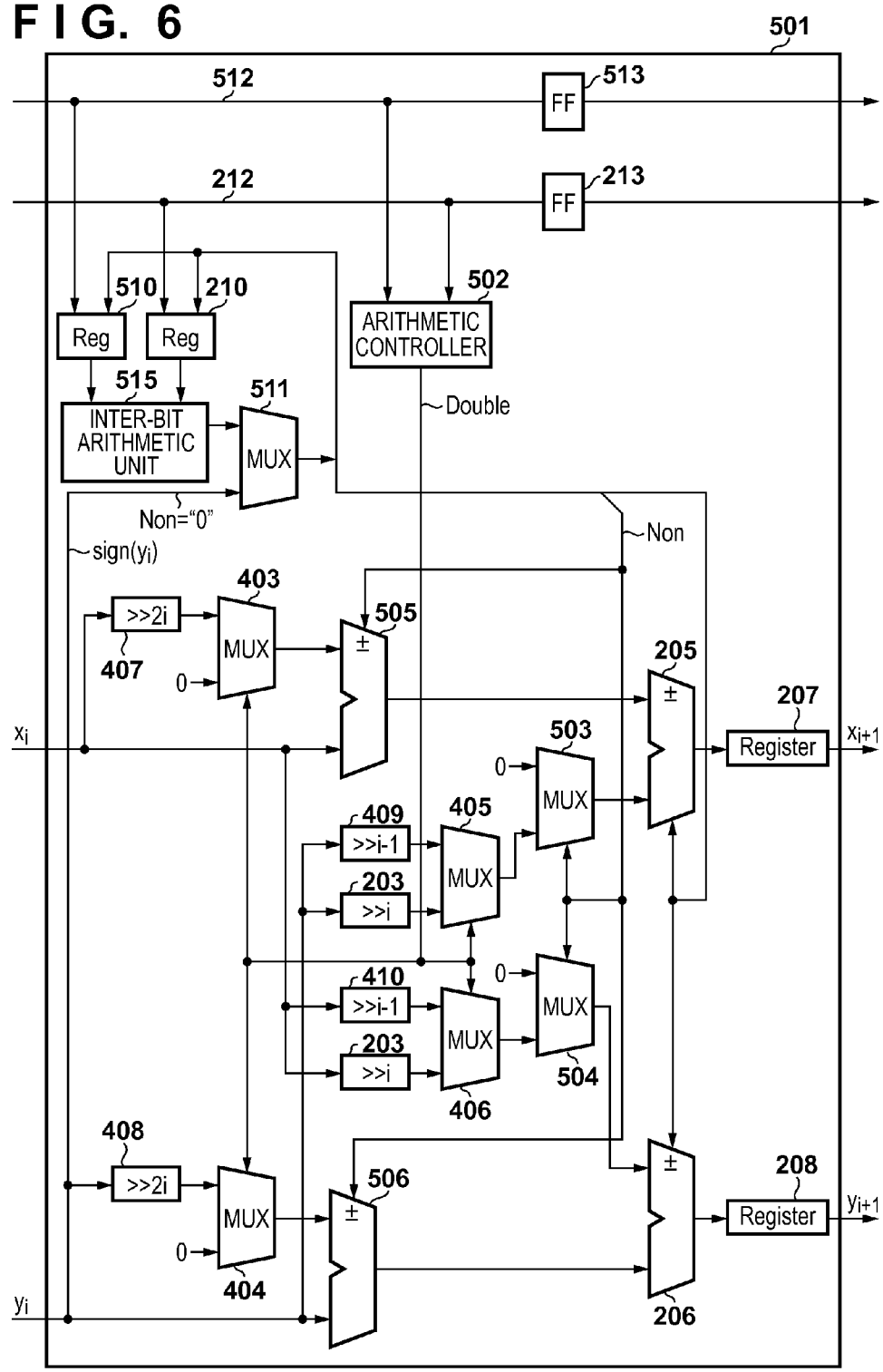
FIG. 6 is a view showing the arrangement of an arithmetic unit according to modification 2.

FIG. 6 is a view showing the arrangement of the arithmetic unit in modification 2. An arithmetic unit 501 is obtained by adding new constituent elements to the arithmetic unit 401 of modification 1 shown in FIG. 4.

To use the non-rotation calculation, the double type calculation is basically executed in an arithmetic operation in the rotation mode. Therefore, an arithmetic controller 502 is a logic circuit which outputs "1" as the control signal Double if both of two mode signals have the rotation mode. In the other mode, the value of the control signal Double is determined based on an arithmetic function to be described later.

In modification 2, first and second vector coordinate data are successively input, rotational direction information of the first vector coordinate data is held in the register 210, and that of the second vector coordinate data is held in a register 510. A signal line 512 for distributing a mode signal as a control signal for holding the rotational direction information of the latter is added.

Like the mode signal distributed by the signal line 212, the mode signal distributed by the signal line 512 is delayed by one cycle by a delay device and supplied to the arithmetic unit in the next stage.

Note that the weight of the rotational direction information changes in accordance with whether the operation mode when loading the rotational direction information is the single type calculation or double type calculation. For example, the weight of the rotational direction information is [−1, +1] when the operation mode is the single type calculation, and is [−2, +2] when the operation mode is the double type calculation. Even when the weight thus changes, an actual 1-bit signal is held as [0, 1].

An inter-bit arithmetic unit 515 is a calculator which performs weighted addition or subtraction such that the result is [−2, 0, +2]. Since the result has three states, this result is expressed as, for example, [00, 10, 01] by a 2-bit signal. Since this arithmetic operation is not simple bit addition or subtraction, it is expressed as "the inter-bit operation" in this example. The inter-bit operation result is selected by a selector 511, and used to control an adder/subtracter or another selector.

In this example, a control signal $N_{on}$ for performing the non-rotation calculation in order to clarify the control of the arithmetic circuit. The upper bit of the 2-bit signal corresponds to the control signal $N_{on}$. To fix the control signal $N_{on}$ to "0" in the vectoring mode, $N_{on}=0$ is added to sign($y_i$) and input to the selector 511.

When performing addition or weighted addition on two weights in the rotation mode, exclusive OR of two pieces of rotational direction information is used. This is so because if the two pieces of rotational direction information do not match, the rotational directions are opposite and cancel each other, resulting in non-rotation. If the two pieces of rotational direction information match when performing subtraction or weighted subtraction, the rotations cancel each other and cause non-rotation, so the control signal $N_{on}$ is generated by matching logic of the two pieces of rotational direction information.

FIGS. 7A to 7E show the correspondence between the input and output of the rotational direction information, and the relationship between control signals representing non-rotation. More specifically, FIGS. 7A to 7E show the correspondence between the input and output of the rotational direction information expressed by weighting, and the relationship between the control signals $N_{on}$ representing non-rotation.

Figure 7:
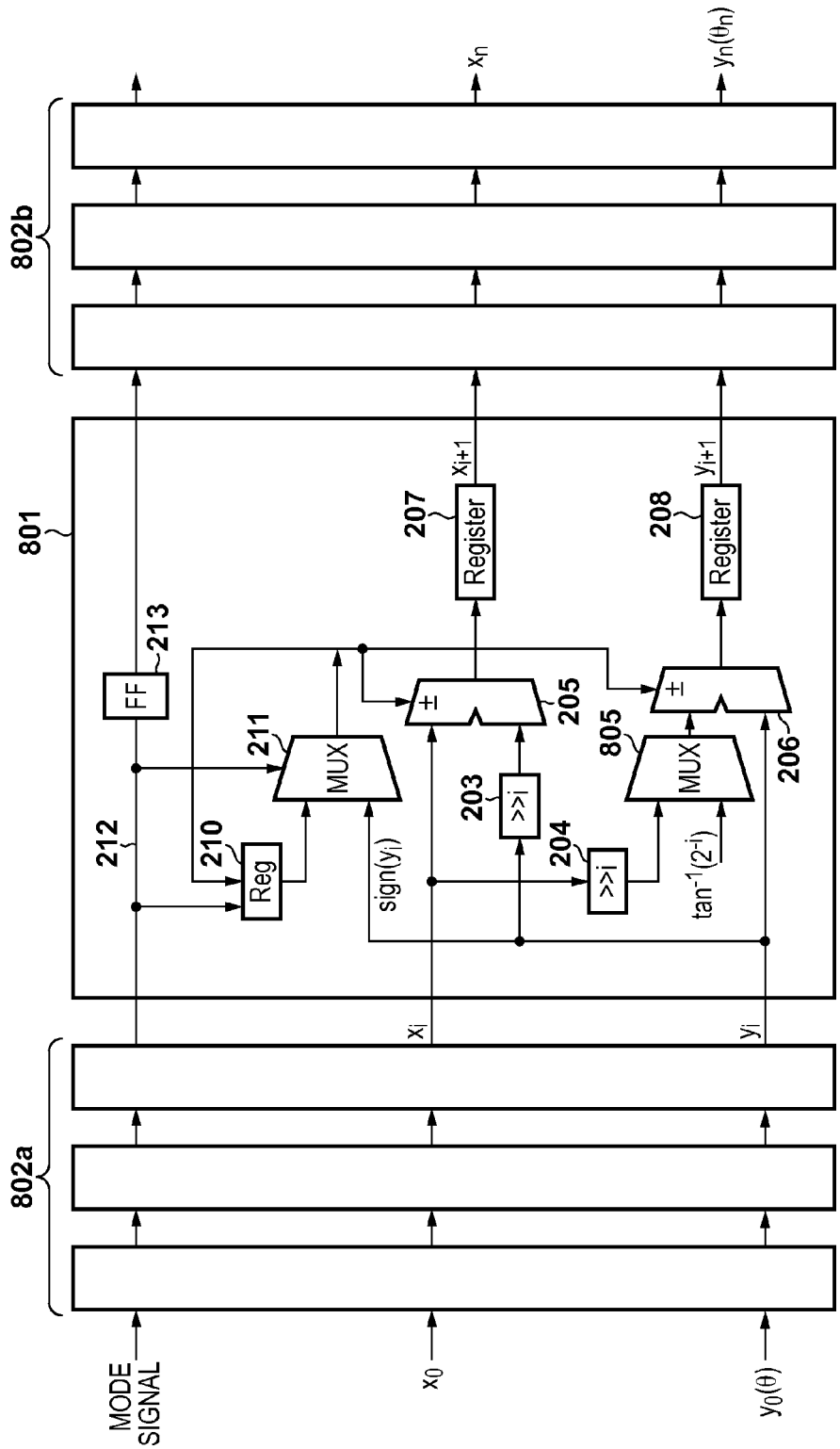
FIGS. 7A to 7E show the correspondence between input and output of rotational direction information, and the relationship between control signals representing non-rotation.

FIG. 7A shows the result obtained by simply adding two weights. FIG. 7B shows the result obtained by subtracting the weight of input "2" from that of weight "1". FIG. 7C shows the result obtained by simply averaging the two weights. FIG. 7D shows the result obtained by weighting inputs "1" and "2" by "1" and "1/2", and adding the results. FIG. 7E shows the result obtained by weighting inputs "1" and "2" by "1/2" and "1", and adding the results. The correspondence to these results is determined by the type (single or double) of the arithmetic operation when vectorizing the above-mentioned inputs.

To set the weight for the input to 1, the input coordinate data is vectorized by the single type calculation. To set the weight to 1/2, the input coordinate data is vectorized by the double type calculation. The control signal Double generated by the arithmetic controller 502 controls this vectorization.

In all the relationships shown in FIGS. 7A to 7E, the control signal $N_{on}$ representing non-rotation is "1" when the addition/subtraction result is ±0. That is, the control signal $N_{on}$ controls the newly added two selectors 503 and 504 and adders/subtracters 505 and 506.

When control signal $N_{on}=1$, the selectors 503 and 504 each select input "0" in the upper stage, thereby performing an arithmetic operation in which non-diagonal elements of a rotation matrix are "0", that is, an arithmetic operation in which the rotation angle is zero. Also, the adders/subtracters 505 and 506 enter the addition mode, and perform a scaling operation of $x_i$ and $y_i$ based on equations (3), thereby matching the scaling with that performed when the rotation calculation is performed.

<Operation of Apparatus>

An example of a process of implementing the rotating function corresponding to FIG. 7E will be explained. In this example, the first vector coordinate data is input in the first cycle to a pipelined CORDIC in which M arithmetic units 501 are cascade-connected, and the second vector coordinate data is input in the second cycle. The pipelined CORDIC vectorizes the first coordinate data by the double type calculation, and vectorizes the second coordinate data by the single type calculation.

Letting $\theta_1$ be the argument of the first vector coordinate data, and $\theta_2$ be the argument of the second vector coordinate data, the coordinate rotation angle is $(\theta_1/2)+\theta_2$ from the input/output correspondence shown in FIG. 7E. This coordinate rotation is applied to coordinate data to be input from the third cycle in the rotation mode.

If these coordinate data are continuously input from the third cycle without a break, they can be processed with the highest performance. However, not all data need be continuously input, and dummy data may also be inserted.

The pipelined CORDIC outputs the polar coordinate absolute value of the coordinate data after M cycles since the second vector coordinate data is input. From the next cycle, coordinate data rotated by $(\theta_1/2)+\theta_2$ or dummy data is rotated and output in the input order.

Vector coordinate data to be input next is input as a new first cycle, and the process explained above is repeated. In this case, the input/output correspondence can be changed from FIG. 7E to FIG. 7A, 7B, 7C, or 7D by changing the setting of the arithmetic controller 502. To use the pipelined CORDIC with its highest performance, however, the control signal for changing the setting must be supplied to the arithmetic unit in the next stage after being delayed by one cycle by a delay circuit (not shown). In other words, the control signal and coordinate data must be transferred in synchronism with each other to the arithmetic unit in the next stage.

When rotating coordinate data by a new synthetic rotation angle, two vector coordinate data are basically input, but it is sometimes possible to reuse one of the previous arguments. In this case, an argument which cannot be reused need only be updated to the argument of coordinate data to be newly input, so only one coordinate data needs to be input.

(Modification 3)

As modification 3, an arrangement capable of implementing a new rotating function will be explained. More specifically, the arrangement of an arithmetic unit is the same as that of the arithmetic unit 501, but a function of selecting one of two inputs is added to the inter-bit arithmetic unit 515. This allows one pipelined CORDIC to process both the vectoring mode and rotation mode.

The same coordinate data is input as the first and second vector coordinate data. Therefore, the arguments of the coordinate data are the same, and they are $\theta_1=\theta_2=2\psi$. However, the first vector coordinate data is vectorized by the single type calculation, and the second coordinate data is vectorized by the double type calculation.

Thus, rotational direction information is loaded to the registers 210 and 510, and the functions of the inter-bit arithmetic unit 515 are switched while the rotational direction information is held in these registers, thereby implementing various rotating functions. The implementable rotating functions are four types, that is, $\psi$, $2\psi$, $3\psi$, and $4\psi$, as will be described below.

When coordinate rotation is performed by the single type calculation based on argument $\theta_2=2\psi$ held by vectorization by the double type calculation, the rotation angle is $\psi$, that is, half the argument.

When coordinate rotation is performed by the double type calculation based on held argument $\theta_2=2\psi$, the rotation angle is $2\psi$, that is, the same as the argument.

When coordinate rotation is performed by the double type calculation by performing an inter-bit operation shown in FIG. 7D, the rotation angle is synthetic angle $\theta_1+(\theta_2/2)=3\psi$.

When coordinate rotation is performed by the double type calculation based on argument $\theta_1=2\psi$ held by vectorization by the single type calculation, the rotation angle is $4\psi$, that is, twice the argument.

In the above-described embodiment, coordinate data having the same argument $\theta_1=\theta_2=2\psi$ are loaded by vectorization performed by different arithmetic operations. If two arguments are different and the ratio of the arguments has a simple relationship, it is possible to load the arguments by using the same vectorizing operation, and implement a rotating function similar to the above-described processing by using this relationship.

As described above, one pipelined CORDIC can process both the vectoring mode and rotation mode by using the registers 210 and 510 for holding rotational direction information. It is also possible to implement a rotation at an angle obtained by weighted synthesis of two angles by holding a plurality of pieces of rotational direction information for each arithmetic unit, and performing inter-bit operations between the plurality of pieces of rotational direction information. Since these processes do not calculate an argument having a large delay, the processes can be performed with a small delay. In addition, a low-cost circuit can be implemented because one pipelined CORDIC can perform the processes.

Second Embodiment

In the second embodiment, an arrangement which reduces redundant portions of the arrangement shown in FIG. 3 described above will be explained. That is, like the calculation of sine or cosine, it is meaningless to calculate the rotation angle many times by using the same rotational direction information, and it is sufficient to calculate the rotation angle once. More specifically, redundant portions exist in the arrangement shown in FIG. 3 having the pipeline for calculating the rotation angle θ.

<Apparatus Arrangement>

Figure 8:
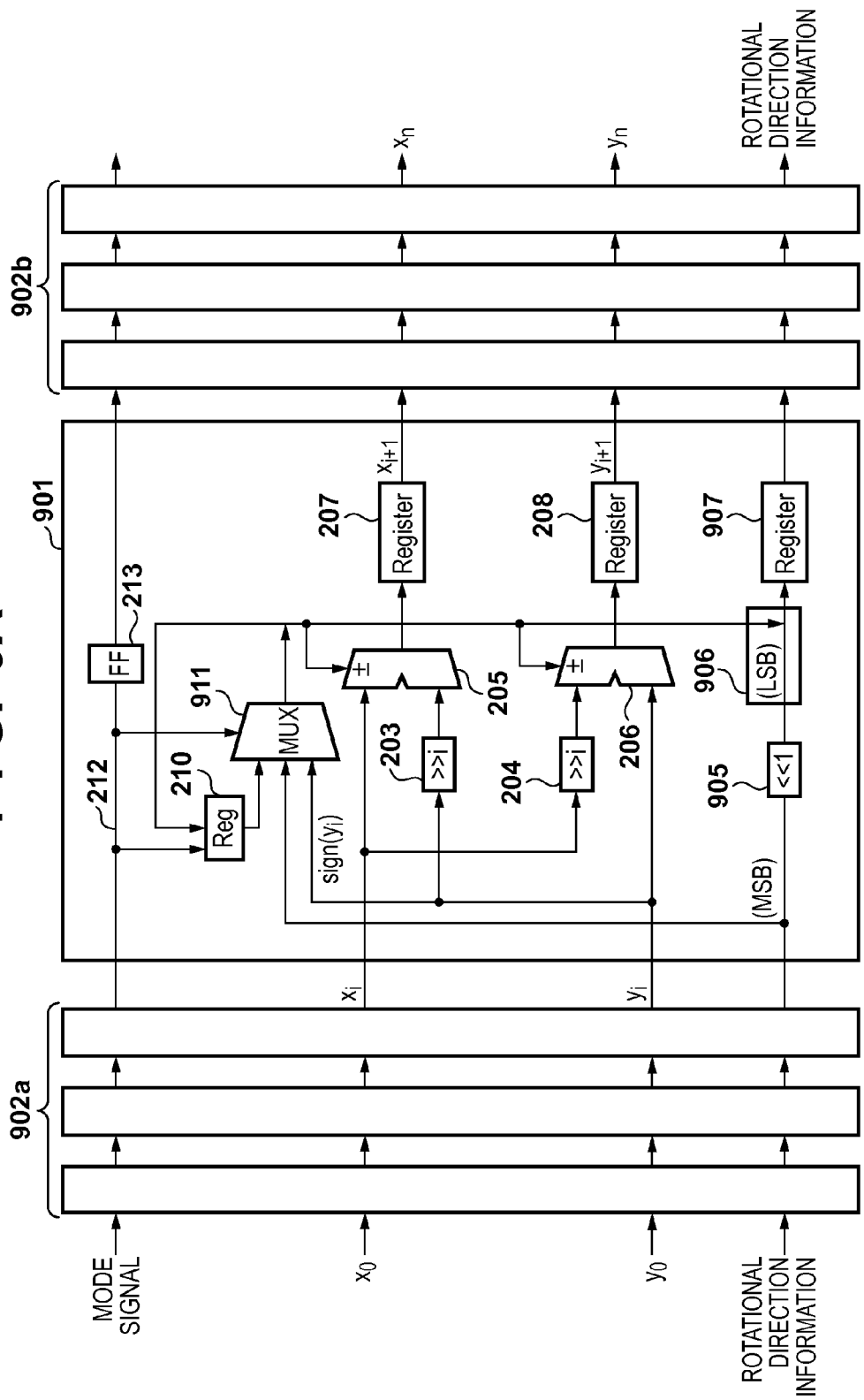
FIG. 8 is a view showing the arrangement of an arithmetic apparatus according to the second embodiment.

FIG. 8 is a view showing the arrangement of an arithmetic apparatus according to the second embodiment. The arrangement of an arithmetic unit 801 is obtained by changing the arrangement of the y-coordinate rotation calculation in the arrangement shown in FIG. 2.

In a y-coordinate calculation path of the rotation mode of the arithmetic unit 801, x-coordinate shift data from an x-coordinate calculation path is switched to numerical data of an angle of $\arctan(2^{-1})$. More specifically, a selector 805 performs this switching, so that the rotation angle can be calculated by the y-coordinate calculation path.

This operation of switching to the angle data will be called "the rotation angle calculation mode" hereinafter. Note that a unit by which the angle data is expressed by a numerical value can be any unit, so the calculation can be performed by a unit such as radian or degree.

Also, FIG. 8 does not show a control signal of the selector 805, but the switching must be performed in synchronism with the movement of coordinate data in the pipeline. Like mode information, however, each arithmetic unit must delay the control signal by one cycle and then transmit the signal to an arithmetic unit in the next stage.

As described above, the arrangement incorporating the rotation angle calculating function in the y-coordinate calculation path is naturally unable to perform the vector mode operation and rotation angle calculation at the same time. Therefore, the argument of coordinate data is held as rotational direction information once in the vectoring mode, the vectoring mode is switched to "the rotation angle calculation mode", and the rotation angle is calculated based on the held rotational direction information.

The timing at which the vectoring mode is switched to "the rotation angle calculation mode" can be either the start or end of the period during which the rotational direction information is held in the register 210, that is, the period of the rotation mode.

Two examples of a series of processes related to common rotational direction information will be presented below.

One is a process which starts with "one cycle of the vectoring mode", and sequentially performs "one cycle of the rotation angle calculation mode", "one cycle of sine·cosine calculations", and "K cycles of the rotation of K coordinate data" (a total of (K+3) cycles).

The other is a process which starts with "one cycle of the vectoring mode", and sequentially performs "K cycles of the rotation of K coordinate data" and "one cycle of the rotation angle calculation mode" (a total of (K+2) cycles).

Note that an arrangement in which the rotation angle calculating function is added to the x-coordinate calculation path instead of the y-coordinate calculation path is also possible. Furthermore, it is possible to add the rotation angle calculating function to both the y-coordinate calculation path and x-coordinate calculation path, and calculate angles having different units.

Note that in the pipeline which performs the CORDIC operation in the second embodiment, the operation mode propagates together with coordinate data to the downstream arithmetic unit for each cycle. That is, not all arithmetic units necessarily operate in the same mode. Accordingly, the above-described expression "one cycle of the xxx mode" represents the operation of one of a plurality of stages of arithmetic units, for example, an arithmetic unit in the first stage, and does not represent the operation of the whole pipeline.

(Modification 3)

In modification 3, an example in which another function is implemented by changing the method of control in the same arrangement as that of the second embodiment will be explained.

In the above-described second embodiment, the calculating function of the y-coordinate calculation path in the rotation mode is switched to the calculation of the rotation angle. On the other hand, in modification 3, the calculating function of the y-coordinate calculation path is switched to the calculation of the rotation angle under the control of the vectoring mode. In the normal vectoring mode, the sign of the y-coordinate value determines the rotational direction. In the above-described control state, however, the sign of the rotation angle as a calculation target of the y-coordinate calculation path determines the rotational direction.

In the arrangement shown in FIG. 8, therefore, when the calculating function of the y-coordinate calculation path is switched to the rotation angle calculating function, it is possible to successively expand the input rotation angle into rotational direction information for pointing the rotation angle at 0° (the x-axis). Then, the rotational direction information can be loaded to the register 210. This operation mode will be called "the rotation angle expanding mode" hereinafter.

As in the above-described second embodiment, two examples of a series of processes related to common rotational direction information will be presented below.

One is a process which starts with "one cycle of the rotation angle expanding mode", and sequentially performs "one cycle of sine·cosine calculations" and "L cycles of the rotation of L coordinate data" (a total of (L+2) cycles).

The other is a process which starts with "one cycle of the rotation angle expanding mode", and then performs "L cycles of the rotation of L coordinate data" (a total of (L+1) cycles).

Third Embodiment

In the third embodiment, an arithmetic apparatus capable of directly outputting held information and directly receiving rotational direction information will be explained.

In the above-described first and second embodiments, rotational direction information to be held in the register 210 is generated from coordinate data in the vectoring mode, and generated from the rotation angle or the like in the angle decomposition mode. When new rotational direction information is generated, the rotation direction information generated in the vectoring mode or rotation angle decomposition mode is replaced with the new information and disappears. That is, the rotational direction information can be reused until new rotational direction information is generated.

One method by which the rotational direction information does not disappear but remains is to convert the rotational direction information into a rotation angle, output the rotation angle from the pipeline, and hold the rotation angle outside the pipeline. In this case, the arrangement disclosed in the second embodiment can convert the rotational direction information into the rotation angle. The rotation angle input to the pipeline is converted into the rotational direction information again in the angle decomposition mode, and the converted information is held in the register 210. However, it is presumably rational to be able to directly output and receive the rotational direction information.

<Apparatus Arrangements>

Figure 9:
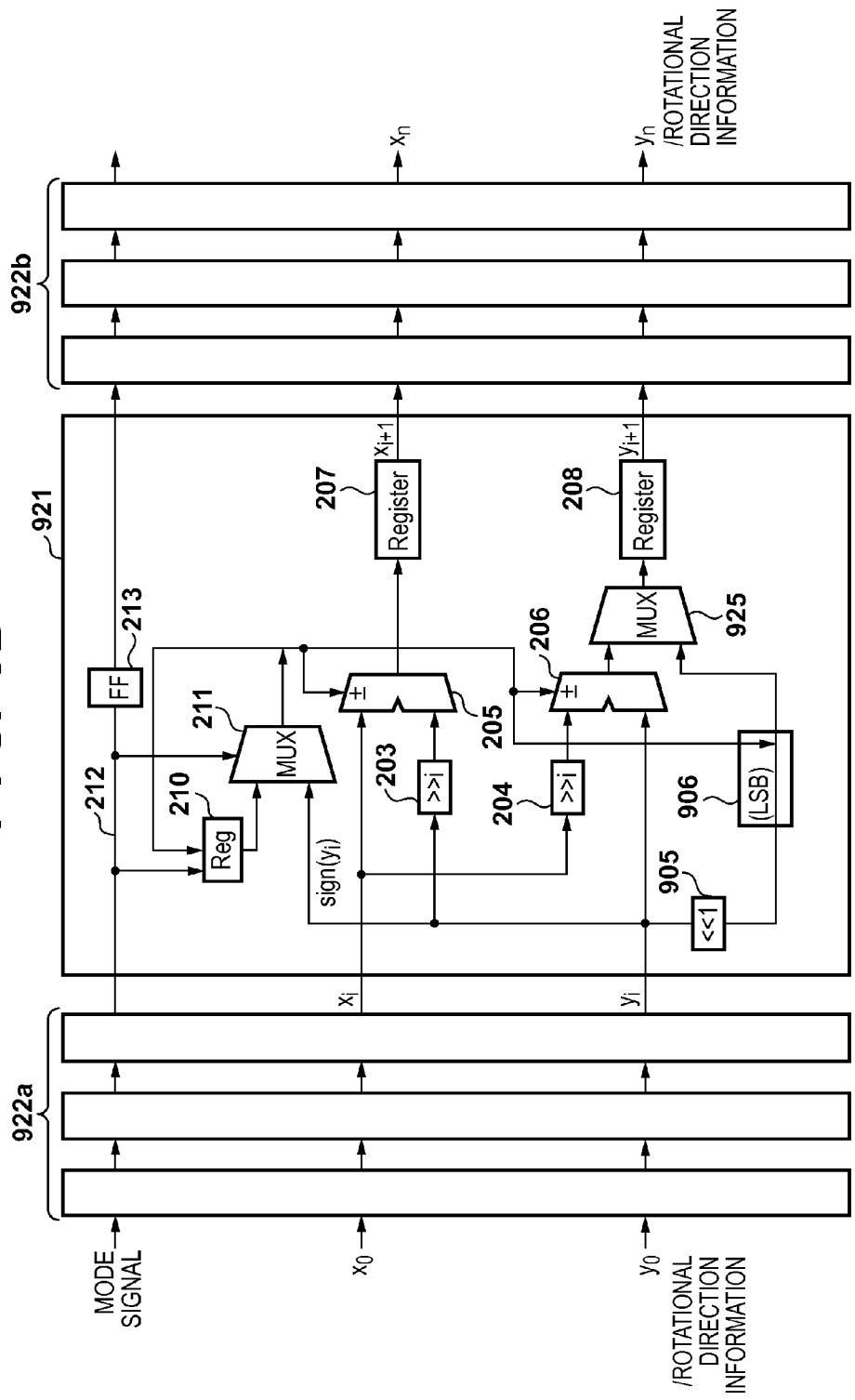
FIGS. 9A and 9B are views showing the arrangements of an arithmetic apparatus according to the third embodiment.

FIGS. 9A and 9B are views showing the arrangements of the arithmetic apparatus according to the third embodiment. In the arrangement shown in FIG. 9A, rotational direction information received from an arithmetic unit in the input stage is shifted leftward by one bit, and the rotational direction information of the arithmetic unit is inserted into the least significant bit. Consequently, pieces of rotational direction information are sequentially connected in the lower-bit direction, and transferred as connected information to an arithmetic unit in the output stage. That is, the rotational direction information is provided for the (i+1)th or subsequent arithmetic unit.

Since 1-bit rotational direction information is connected in each arithmetic unit, the number of bits of the connected information output from the final stage of the pipeline is equal to the number of arithmetic units (that is, the number of stages of the pipeline).

A bit shifter 905 shifts the rotational direction information leftward by one bit. A bit insertion device 906 inserts the rotational direction information into the least significant bit. A register 907 holds the inserted connected information for one cycle.

When receiving once output connected information, the most significant bit of the connected information is extracted, selected by a selector 911, and held in the register 210. Also, the connected information is shifted leftward by one bit, and supplied to the arithmetic unit in the next stage.

FIG. 9A shows the arrangement including a pipeline path for connecting the rotational direction information in addition to the x- and y-coordinate calculation paths, like the arrangement shown in FIG. 3. This makes it possible to input connected information and rotate the coordinates based on the connected information at the same time. In addition, when holding the input connected information bit by bit in each arithmetic unit, the rotational direction information held in the register 210 immediately before that can be output by sequentially connecting the information from the upper stage. That is, it is possible to simultaneously perform the connected information input process and output process.

Also, like the arrangement according to the second embodiment (FIG. 8), the arrangement shown in FIG. 9B can be formed by using the rotational direction information connection path shown in FIG. 9A as the y-coordinate calculation path. In an arithmetic unit 921, a selector 925 is formed between the adder/subtracter 206 for calculating the y-coordinate and the register 208 for holding the calculation result for one cycle, and performs switching to the connected information. In this arrangement, the rotational direction information connection path is thus used as the y-coordinate calculation path.

In this case, the number of connection paths reduces. Therefore, the performance may decrease because it is not possible to rotate coordinate data and input/output connected information at the same time. However, the decrease in performance is slight because coordinate rotation can be performed after one cycle.

Figure 10:
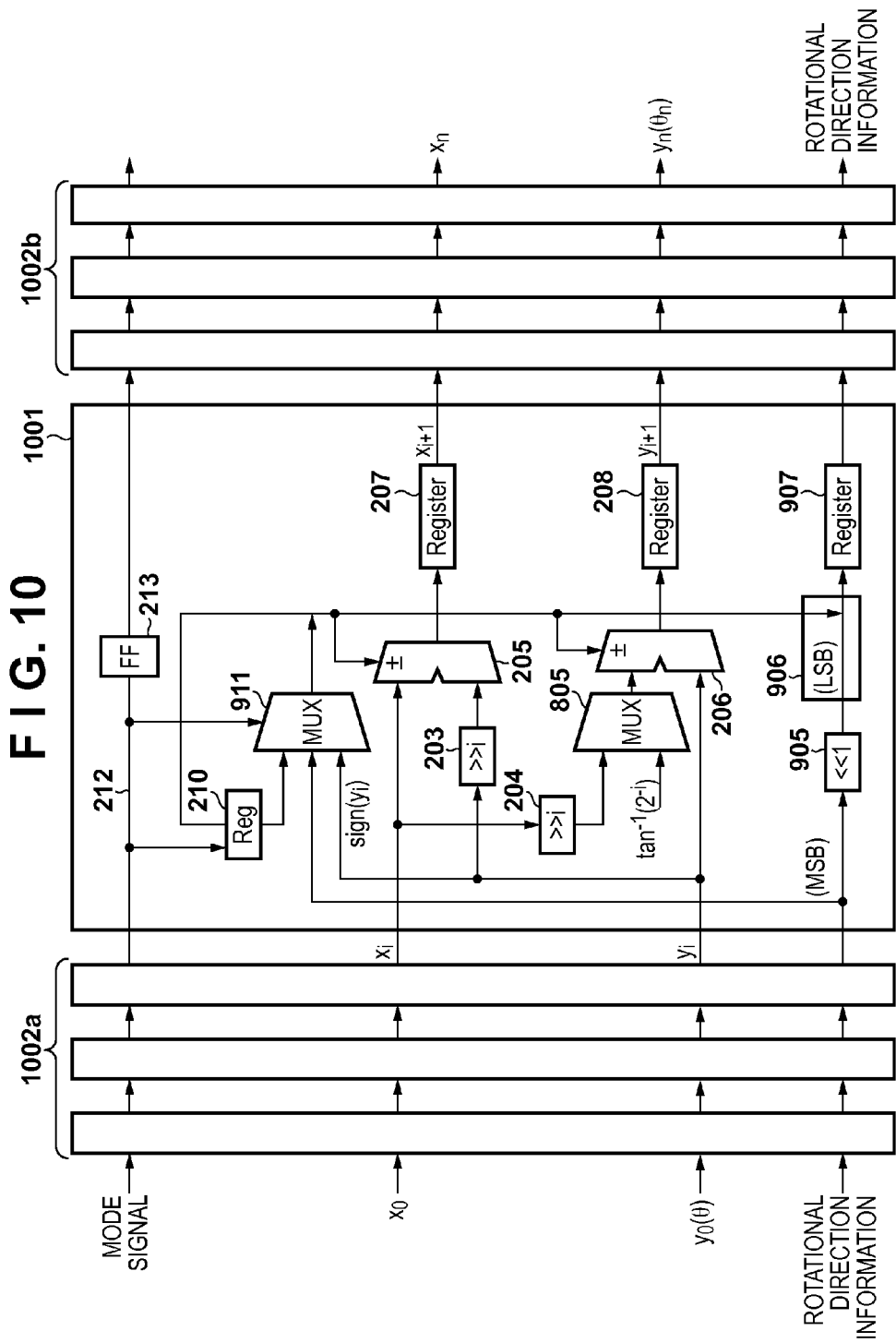
FIG. 10 is a view showing another arrangement of the arithmetic apparatus according to the third embodiment.

FIG. 10 is a view showing another arrangement of the arithmetic apparatus according to the third embodiment. This arrangement is obtained by adding the rotational direction information connecting pipeline path shown in FIG. 9A to the arrangement shown in FIG. 8. An arithmetic unit 1001 has an arrangement obtained by adding the bit shifter 905, bit insertion device 906, and register 907 to the arithmetic unit 801 shown in FIG. 8.

In this arrangement, the rotational direction information held in the register 210 can be used to rotate coordinate data, and can also be output as a pair of sine and cosine, the argument, or the connected information. It is also possible to directly input the output connected information and load it to the register 210. Therefore, when an angle calculated by using the output argument or the like is input, it is possible to expand the input angle into rotational direction information and load it to the register 210. In addition, rotational direction information can be generated from sine·cosine or vector input coordinate data, and load the information to the register 210. In short, the held rotational direction information can be output in four kinds of forms, and information to be held can be input in four kinds of forms.

Fourth Embodiment

<Normalization Division Device>

Problems in the fields of image processing, a search engine, and signal processing often result in solving simultaneous linear equations or unique problems. Also, a nonlinear equation problem is often simplified and deformed into the form of simultaneous linear equations. In recent image processing and signal processing, therefore, solving simultaneous linear equations is one main arithmetic operation of numerical calculations.

Examples of a famous solution for simultaneous linear equations are a Gaussian elimination method and Gauss-Jordan elimination method. In these methods, while manipulating rows and columns when simultaneous linear equations are expressed as a matrix, a coefficient matrix is deformed into an upper triangular matrix or identity matrix, thereby obtaining a solution. When obtaining a final solution, however, a diagonal element must be deformed into "1". Accordingly, it is necessary to normalize a diagonal element to "1" by using some means, and divide other elements in accordance with the diagonal element value before the normalization.

For example, a method of implementing normalization division by using an arrangement similar to the CORDIC is disclosed in Japanese Patent Laid-Open No. 8-137834. More specifically, this arrangement divides each element of a vector (X, Y, Z) by L2-norm $(X^2+Y^2+Z^2)^{1/2}$ by using sing the same arrangement as that shown in FIG. 1A. This arrangement is also applicable to a normalization dividing process for a matrix.

In this case, rotational direction information in the CORDIC can be associated with addition/subtraction determination information in normalization division. Also, when a mode of normalizing a diagonal element to "1" and holding addition/subtraction determination information is defined as "a normalization mode", this mode can be associated with the vectoring mode of the CORDIC. Likewise, when a mode of dividing other elements in the same row by the value of the diagonal element before the normalization based on the addition/subtraction determination information is defined as "a division mode", this mode can be associated with the rotation mode of the CORDIC.

For example, an operation procedure for normalizing a diagonal element of a target matrix to "1" and dividing other elements in the same row by the diagonal element value is as follows. First, a diagonal element ($x_d$) of a matrix is given to input 1 and zero is given to input 2 in the normalization mode, and addition/subtraction determination information for normalizing the element value to "1" is held. After that, the normalization mode is changed to the division mode, other elements ($x_s$, s=1, 2, 3, . . . ) in the same row are sequentially given to input 1, and zero is given to input 2. As output after the arithmetic operation of the number N of processing stages, other elements $y_s=x_s/x_d$ (s=1, 2, 3, . . . ) are output following the normalized value "1" of the diagonal element.

Input 1: $x_0=x_d$, input 2: $y_0=0$
for i=0 to N−1 step 1
if $y_i \geq 1$ then $$x_{i+1}=x_i$$

$$y_{i+1}=y_i-(2^{-(i+1)})\cdot x_i$$

else $$x_{i+1}=x_i$$

$$y_{i+1}=y_i+(2^{-(i+1)})\cdot x_i \quad (4)$$

output: $y_N=1$

<Apparatus Arrangement>

Figure 11:
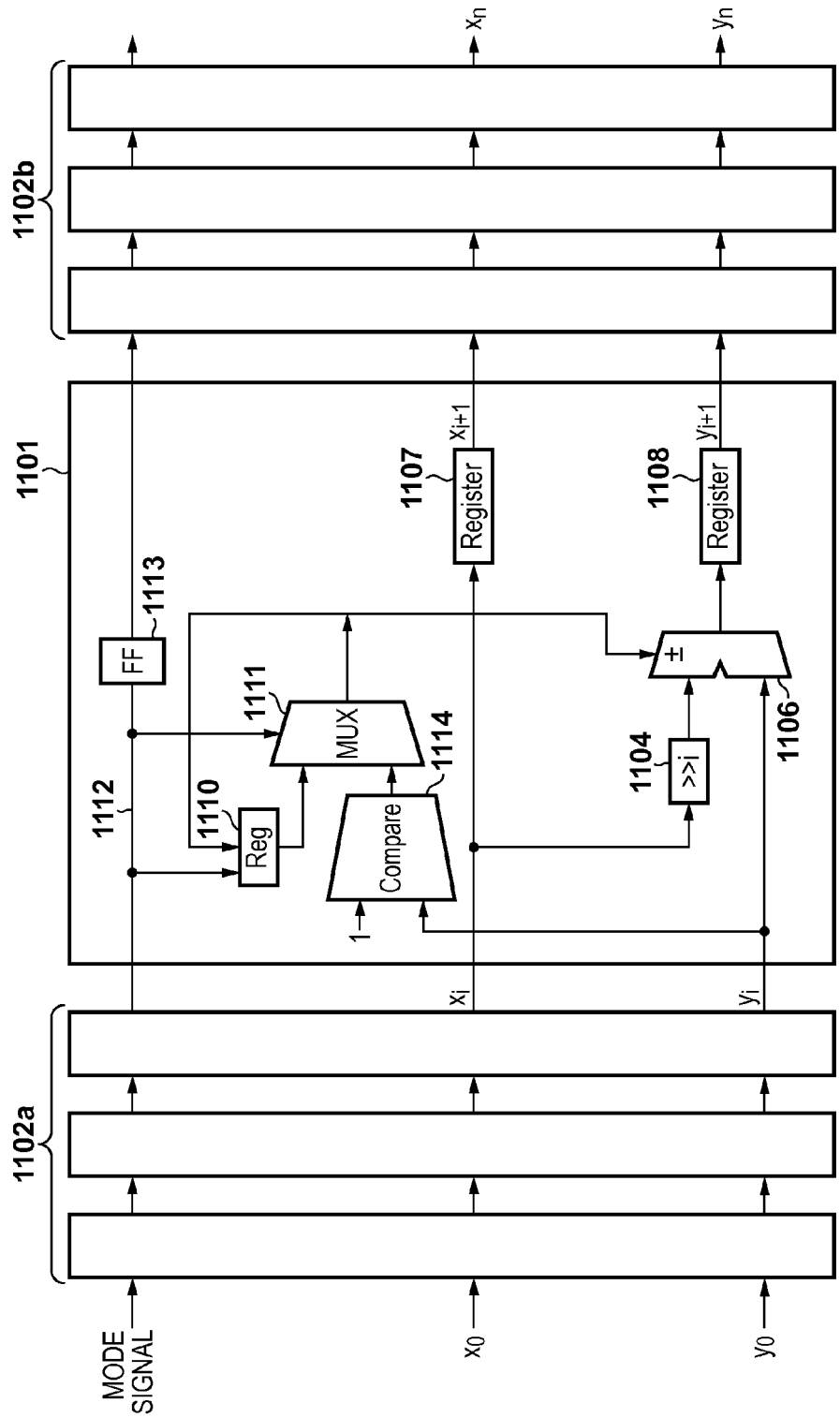
FIG. 11 is a view showing the arrangement of an arithmetic apparatus according to the fourth embodiment.

FIG. 11 is a view showing the arrangement of the arithmetic apparatus according to the fourth embodiment. An arithmetic unit 1101 represents the arrangement of the ith (i=0, 1, 2, 3, . . . ) arithmetic unit forming the pipeline. Front-stage arithmetic units 1102a are arranged in the front stage of the arithmetic unit 1101, and rear-stage arithmetic units 1102b are arranged in the rear stage. The arrangement of each arithmetic unit is the same as that of the arithmetic unit 1101.

The arrangement of the arithmetic unit 1101 will be explained. In this arithmetic unit, a bit shifter 1104 shifts input x-coordinate data $x_i$ rightward by i bits. An adder/subtracter 1106 adds or subtracts the output of the bit shifter 1104 to or from input y-coordinate data $y_i$. A register 1107 holds $x_i$ for one cycle. A register 1108 holds the output data from the adder/subtracter 1106 for one cycle. The normalizing operation of equation (4) is performed by using these constituent elements, and the result is held by the register 1108.

Next, constituent elements newly required in the apparatus according to the fourth embodiment will be explained. A register 1110 is a 1-bit register for holding addition/subtraction determination information. A selector 1111 selects one of addition/subtraction determination information determined in accordance with the input data $y_i$, and addition/subtraction determination information held in the register 1110.

A signal line 1112 distributes 1-bit mode information representing whether the processing mode of data currently being processed by the arithmetic unit is the normalization mode or division mode. A delay device 1113 delays the mode information by one cycle. A comparator 1114 compares the input data $y_i$ with the normalized value "1", and outputs addition/subtraction determination information.

<Operation of Apparatus>

The operation of the normalization mode and division mode will be explained mainly based on the above-described constituent elements. As a practical operation, an example in which processing is performed for one cycle in the normalization mode and subsequently performed for six cycles in the division mode will be introduced.

Mode information is used as a control signal for changing the operation mode. For example, mode information "1" is input for one cycle as the normalization mode to the arithmetic unit in the first stage, and subsequently mode information "0" is input for six cycles as the division mode. That is, one normalization target diagonal element data is input as data $x_0$ in synchronism with mode information "1", and subsequently six other element data in the same row are input as data $x_0$ in synchronism with mode information "0". In this step, "0" is input to data $y_0$. After n-stage pipeline processing, normalized value "1" is output to data $y_n$.

When mode information "1" is input, each arithmetic unit operates in the normalization mode. In the normalization mode, the selector 1111 selects the output from the comparator 1114 so as to control the arithmetic operations of the adders/subtracters 1105 and 1106 based on the output from the comparator 1114. In this step, the output from the selector 1111 is also loaded into the register 1110 for holding addition/subtraction determination information. A normalizing operation integrating the addition/subtraction determination information held in the whole pipeline corresponds to division by the value of the diagonal element data.

When mode information "0" is input, each arithmetic unit operates in the division mode. In the division mode, the elector 1111 selects addition/subtraction determination information held in the register 1110, and an addition/subtraction process is performed on input data based on the addition/subtraction determination information. Since the addition/subtraction determination information is kept held while the mode information is "0", the same addition/subtraction process is performed on the six continuously input data. After the n-stage pipeline processing, the value divided by the diagonal element value before the normalization is output as data $y_n$.

FIGS. 12A and 12B show calculation examples in the normalization mode and division mode. That is, FIG. 12A shows the calculation example in the normalization mode, and FIG. 12B shows the calculation example in the division mode.

Referring to FIGS. 12A and 12B, the number of pipeline stages is "10". In the normalization mode, as shown in FIG. 12A, normalized "1" is output in data $y_{10}$. In the division mode, the calculation is performed by using addition/subtraction determination information set in the normalization mode, and the value divided by the element before the normalization is output in data $y_{10}$.

In the fourth embodiment as has been explained above, addition/subtraction determination information generated by the normalization mode is held in the register in each arithmetic unit. Then, division is performed based on the held addition/subtraction determination information.

In this arrangement, one pipeline can process both the normalization mode and division mode. Therefore, the dividing process can efficiently be performed by a low-cost circuit. More specifically, processing performance almost equal to that of the conventional apparatus can be implemented by a half circuit scale.

Fifth Embodiment

In the fifth embodiment, an arithmetic apparatus capable of directly outputting held information and directly receiving addition/subtraction determination information will be explained.

Addition/subtraction determination information generated in the normalization mode is kept held in a holding means and used in data division until the next addition/subtraction determination information is generated. However, when new addition/subtraction determination information is generated, the old addition/subtraction determination information is replaced with the new one and disappears.

Accordingly, this embodiment makes it possible to directly output addition/subtraction determination information and re-input it. More specifically, when outputting addition/subtraction determination information, bits of the addition/subtraction determination information are connected in each arithmetic unit and output from the pipeline, and the bit string of the addition/subtraction determination information is held outside the pipeline. When inputting the bit string of the addition/subtraction determination information, bits of the addition/subtraction determination information bit string are extracted in each arithmetic unit and held in the holding means.

<Apparatus Arrangement>

Figure 13:
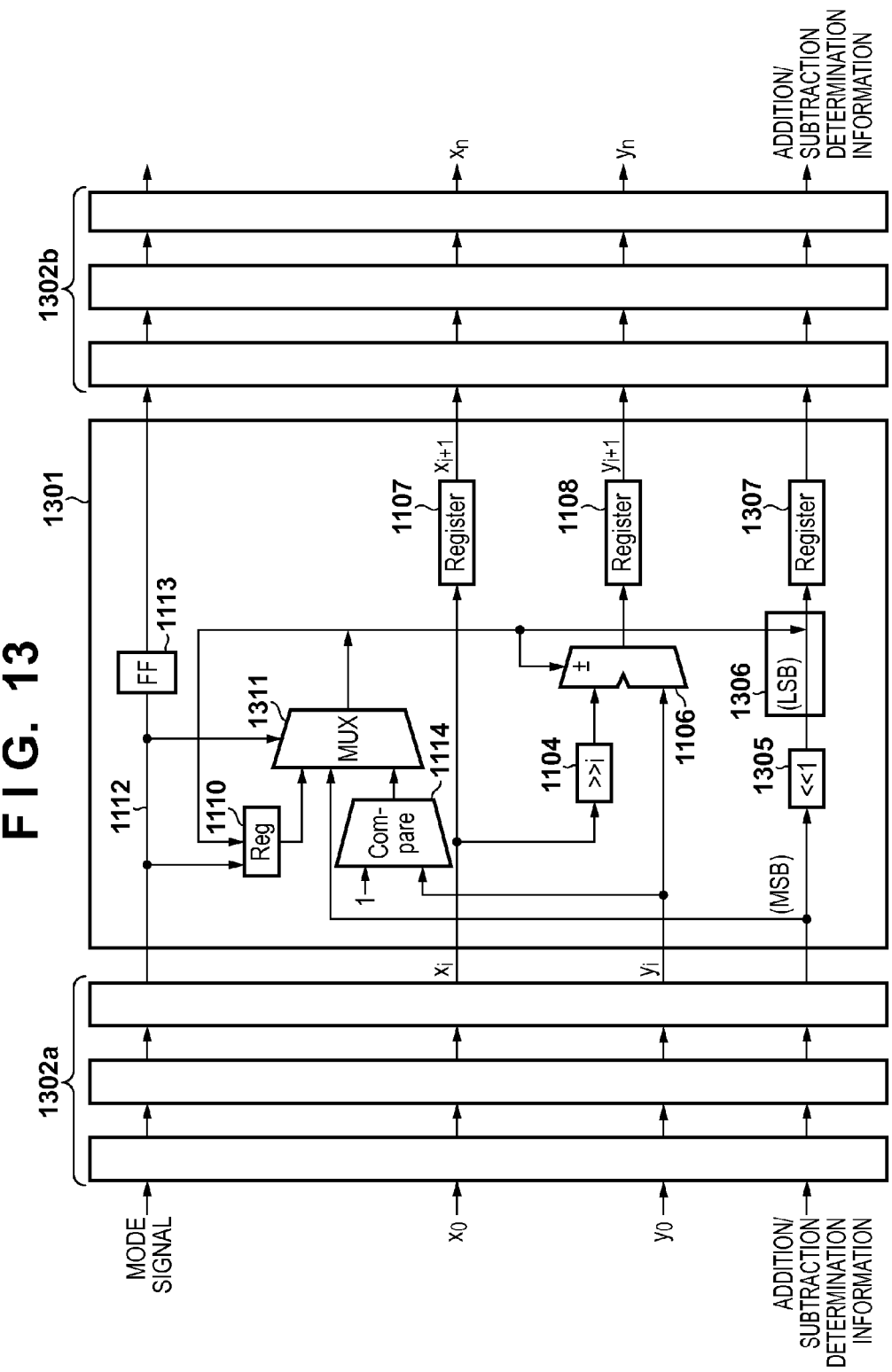
FIG. 13 is a view showing the arrangement of an arithmetic apparatus according to the fifth embodiment.

FIG. 13 is a view showing the arrangement of the arithmetic apparatus according to the fifth embodiment. In this arrangement shown in FIG. 13, after addition/subtraction determination information received from an arithmetic unit in the preceding stage is shifted leftward by one bit, and the addition/subtraction determination information of the arithmetic unit is inserted into the least significant bit, thereby sequentially connecting the addition/subtraction determination information in the lower-bit direction, and outputting the connected information. Since 1-bit addition/subtraction determination information is connected in each arithmetic unit, the number of bits of the connected information output from the final stage of the pipeline is equal to the number of arithmetic units (that is, the number of stages of the pipeline).

A bit shifter 1305 shifts the addition/subtraction determination information leftward by one bit. A bit insertion device 1306 inserts the addition/subtraction determination information into the least significant bit. A register 1307 holds the inserted connected information for one cycle.

When inputting once output connected information, the most significant bit of the connected information is extracted, selected by the selector 1311, and held in the holding means. Also, the connected information is shifted leftward by one bit, and supplied to the arithmetic unit in the next stage.

The arrangement shown in FIG. 13 includes the pipeline path for connecting addition/subtraction determination information, in addition to the calculation paths of input data $x_i$ and $y_i$.

In this arrangement, it is possible to input connected information and perform normalization division based on the connected information at the same time. Furthermore, when holding input connected information bit by bit in each arithmetic unit, addition/subtraction determination information held in the holding means immediately before that can sequentially be connected from the upper stage and output. That is, it is possible to simultaneously perform the connected information input process and output process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-116196, filed Jun. 4, 2014 which is hereby incorporated by reference herein in its entirety.

What is claimed is:

1. An arithmetic apparatus comprising a plurality of cascade-connected arithmetic units, each of the plurality of arithmetic units comprising:
   a calculator configured to operate in one of a rotation mode for performing a rotation calculation, and a vectoring mode for calculating a rotation angle;
   a register configured to hold a rotational direction in the rotation calculation by the calculator; and
   a selector configured to select a sign of specific input data to the calculator and output the selected sign to the calculator and register as the rotational direction in the vectoring mode, and select the rotational direction held in the register, output the selected rotational direction to the calculator, and maintain the rotational direction held in the register in the rotation mode,
   wherein when operating in the rotation mode, the calculator performs the rotation calculation on data input from a preceding arithmetic unit in the plurality of cascade-connected arithmetic units, with the rotational direction from the selector, and
   wherein operations of the calculator in the vectoring mode and the rotation mode are controlled by the selected rotational direction output from the selector.

2. The apparatus according to claim 1, wherein the arithmetic unit further comprises an angle calculator configured to calculate a rotation angle to be output to an arithmetic unit in a subsequent stage, based on a rotation angle input from an arithmetic unit in a preceding stage.

3. The apparatus according to claim 2, wherein
   the arithmetic apparatus comprises n arithmetic units, wherein n is an integer not less than 2, and
   in an $i^{th}$ arithmetic unit, wherein i is a natural number not more than n,
   the angle calculator is configured by using one calculation path included in the calculator, and calculates a rotation angle to be output to an $(i+1)^{th}$ arithmetic unit based on $\arctan(2^{-i})$ and a rotation angle input from an $(i-1)^{th}$ arithmetic unit.

4. The apparatus according to claim 1, wherein at least one of the plurality of arithmetic units connects bits of the rotational direction held in the register of the at least one of the plurality of arithmetic units, and output the connected rotational direction.

5. The apparatus according to claim 4, wherein each arithmetic unit connects bits of the rotational direction input from the preceding arithmetic unit in the plurality of cascade-connected arithmetic units and rotational direction held in the register, and outputs the connected rotational direction to an arithmetic unit in a subsequent stage.

6. The apparatus according to claim 1, wherein the calculator is configured to execute any of a plurality of rotation calculating methods, and rotation angles of the plurality of rotation calculating methods have an integral ratio relationship.

7. The apparatus according to claim 6, wherein the calculator can execute different rotation calculating methods in the rotation mode and the vectoring mode.

8. The apparatus according to claim 7, wherein
   the calculator is further configured as a double-rotation COordinate Rotation DIgital Computer (CORDIC) calculator, and configured to execute a single type calculation of calculating $\arctan(2^{-i})$, and a double type calculation of calculating $2 \cdot \arctan(2^{-i})$, and the double-rotation CORDIC calculator is configured to time-divisionally operate by one of the single type calculation and the double type calculation in accordance with a mode signal input from an $(i-1)^{th}$ arithmetic unit, and configured to perform a rotation calculation which is two times a rotation angle by combining the single type calculation in the vectoring mode and the double type calculation in the rotation mode, and perform a rotation calculation which is 1/2 times a rotation angle by combining the double type calculation in the vectoring mode and the single type calculation in the rotation mode.

9. The apparatus according to claim 8, wherein the register is configured to hold a first rotational direction output for first coordinate data and a second rotational direction output for second coordinate data by an operation in the vectoring mode, and when operating in the rotation mode, the calculator performs a rotation calculation based on the first rotational direction and the second rotational direction.

10. The apparatus according to claim 9, wherein based on whether the operation in the vectoring mode performed when the first rotational direction and the second rotational direction are output is the single type calculation or the double type calculation, the double-rotation CORDIC calculator determines a first weight for the first rotational direction and a second weight for the second rotational direction, and performs a rotation calculation by using the determined weights.

11. A control method of an arithmetic apparatus comprising a plurality of cascade-connected arithmetic units each including a calculator configured to operate in one of a rotation mode for performing a rotation calculation and a vectoring mode for calculating a rotation angle, comprising:

selecting a sign of specific input data to the calculator and outputting the selected sign to the calculator and a register as a rotational direction in the vectoring mode by a selector;

calculating a rotation angle in the vectoring mode, by the calculator, which is controlled by the sign of the specific input data selected by the selector;

selecting the rotational direction held in the register, outputting the selected rotational direction to the calculator, and maintaining the rotational direction held in the register in the rotation mode by the selector; and performing a rotation calculation on data input from a preceding arithmetic unit in the plurality of cascade-connected arithmetic units with the selected rotation direction output from the selector in the rotation mode, by the calculator, wherein operations of the calculator in the vectoring mode and the rotation mode are controlled by the selected rotational direction output from the selector.

* * * * *